US009850070B2

(12) United States Patent
Beyer

(10) Patent No.: US 9,850,070 B2
(45) Date of Patent: Dec. 26, 2017

(54) ENVIRONMENTALLY FRIENDLY RUBBER COMPOSITION

(71) Applicant: WCCO Belting, Inc., Wahpeton, ND (US)

(72) Inventor: Mark Beyer, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 67 days.

(21) Appl. No.: 14/639,667

(22) Filed: Mar. 5, 2015

(65) Prior Publication Data

US 2016/0075901 A1    Mar. 17, 2016

Related U.S. Application Data

(60) Provisional application No. 62/051,755, filed on Sep. 17, 2014.

(51) Int. Cl.
*B65G 15/34* (2006.01)
*C09D 109/06* (2006.01)
(Continued)

(52) U.S. Cl.
CPC .............. *B65G 15/34* (2013.01); *B65G 15/32* (2013.01); *C08K 3/0033* (2013.01);
(Continued)

(58) Field of Classification Search
CPC ........ B65G 15/34; B65G 15/32; B29D 29/06; C09D 107/00; C09D 109/06;
(Continued)

(56) References Cited

U.S. PATENT DOCUMENTS 3,415,700 A * 12/1968 Webster ................. B29D 29/00
156/164
7,211,611 B2 * 5/2007 Wilson, III ............ A43B 13/04
523/167

(Continued)

OTHER PUBLICATIONS

Notification of Transmittal of the International Search Report and Written Opinion of the International Searching Authority(PCT/US2015/19016) dated Jun. 3, 2015—21 pages.

(Continued)

*Primary Examiner* — Leslie A Nicholson, III
*Assistant Examiner* — Keith R Campbell
(74) *Attorney, Agent, or Firm* — Michael A. Bondi; Moss & Barnett

(57) ABSTRACT

Belting for use in a conveyor. The belting includes a fabric base and an environmentally friendly rubber composition. The environmentally friendly rubber composition is applied to at least one surface of the fabric base. The environmentally friendly rubber composition includes a rubber component, a filler, a processing oil and a vulcanizing agent. The filler is provided at a concentration of between about 50 and 150 parts per hundred weight of the rubber component. The processing oil is substantially devoid of aromatic oil. The processing oil is provided at a concentration of between about 20 and 60 parts per hundred weight of the rubber component. The vulcanizing agent is provided at a concentration of between about 1 and 10 parts per hundred weight of the rubber component.

21 Claims, 3 Drawing Sheets

Tensile Strength (psi)

(51) Int. Cl.
*C09D 107/00* (2006.01)
*C08K 3/00* (2006.01)
*C08K 5/00* (2006.01)
*B65G 15/32* (2006.01)
*D06M 11/56* (2006.01)
*D06M 11/74* (2006.01)
*D06M 11/76* (2006.01)
*D06M 11/79* (2006.01)
*D06M 13/188* (2006.01)
*D06M 13/203* (2006.01)
*D06M 15/693* (2006.01)

(52) U.S. Cl.
CPC .......... *C08K 5/0025* (2013.01); *C09D 107/00* (2013.01); *C09D 109/06* (2013.01); *D06M 11/56* (2013.01); *D06M 11/74* (2013.01); *D06M 11/76* (2013.01); *D06M 11/79* (2013.01); *D06M 13/188* (2013.01); *D06M 13/203* (2013.01); *D06M 15/693* (2013.01)

(58) Field of Classification Search
CPC .......... D06M 15/17; D06M 5/19; D06M 5/70; D06M 2400/00; C08K 3/0033; C08K 5/0025
See application file for complete search history.

(56) References Cited

U.S. PATENT DOCUMENTS

| | | | |
|---|---|---|---|
| 7,285,584 B2 | 10/2007 | Hsu | |
| 7,473,724 B2 | 1/2009 | Hsu | |
| 7,700,673 B2* | 4/2010 | Wang | C08K 3/36 524/104 |
| 7,919,553 B2 | 4/2011 | Kawasaki | |
| 8,236,875 B2* | 8/2012 | Recker | B60C 1/00 523/156 |
| 8,261,906 B2* | 9/2012 | Nakano | B29D 29/06 198/846 |
| 9,279,044 B2* | 3/2016 | Yang | C08K 5/13 |
| 2009/0283186 A1* | 11/2009 | Kaszas | B60C 1/0016 152/209.1 |
| 2013/0289183 A1 | 10/2013 | Kerns | |
| 2014/0135424 A1 | 5/2014 | Sandstrom | |
| 2014/0135437 A1 | 5/2014 | Sandstrom | |
| 2014/0155660 A1 | 6/2014 | Calabria | |
| 2014/0162337 A1 | 6/2014 | Chotani | |

OTHER PUBLICATIONS

Flanigan, Using Bio-based plasticizers, alternative rubber, Rubber & Plastic News. 2013. vol. 15-19.
Brentin, Robert, and Sarnacke, Phil, Rubber Compounds, A Market Opportunity Study, Sep. 2011, OMNI Tech International, Ltd., Midland, MI.

\* cited by examiner

Tensile Strength (psi)

Elongation (%)

300% Modulus (psi)

Mooney Viscosity Low (Mooney Units)

Tear Strength (lbs/inch)

Din Abrasion (mm³)

ENVIRONMENTALLY FRIENDLY RUBBER COMPOSITION

This application claims priority to U.S. Provisional Application No. 62/051,755, which was filed on Sep. 17, 2014, the contents of which are incorporated herein by reference.

FIELD OF THE INVENTION

The invention relates generally to environmentally friendly rubber compositions. More particularly, the invention relates to environmentally friendly rubber compositions that are used in fabricating conveyor belts.

BACKGROUND OF THE INVENTION

Because of their ability to move large amounts of material, conveyor belts have been long been used in industry such as for moving agricultural products, rocks and other mined materials and various manufactured products.

One area in which conveyor belts are extensively used is equipment for moving agricultural products and, in particular, agricultural equipment that is used for harvesting. Wide-aspect belts are extensively used in farm machinery, especially harvesting implements, examples of which are discussed in U.S. Pat. Nos. 4,371,580 and 4,518,647.

In many rubber formulations that are used in conjunction with fabricating conveyor belts, it is customary for aromatic petroleum based oil to be used as a processing aid. For a variety of environmental and/or health reasons, it is desirable to reduce and/or eliminate the use of such aromatic petroleum based oil.

Sandstrom et al., U.S. Patent No. 2014/0135424, is directed to rubber compositions fabricated using natural rubber that is processed using soybean oil as a processing aid instead of petroleum-based processing oil.

Sandstrom et al., U.S. Patent No. 2014/0135437, is directed to rubber compositions fabricated using conjugated diene-based elastomer using soybean oil as a processing aid instead of petroleum-based processing oil.

SUMMARY OF THE INVENTION

An embodiment of the invention is directed to belting for use in a conveyor. The belting comprises a fabric base and an environmentally friendly rubber composition applied to at least one surface of the fabric base. The environmentally friendly rubber composition includes a rubber component, a filler, a processing oil and a vulcanizing agent.

The filler is provided at a concentration of between about 50 and 150 parts per hundred weight of the rubber component. The processing oil is substantially devoid of aromatic oil. The processing oil is provided at a concentration of between about 20 and 60 parts per hundred weight of the rubber component. The vulcanizing agent is provided at a concentration of between about 1 and 10 parts per hundred weight of the rubber component.

Another embodiment of the invention is directed to an environmentally friendly rubber composition that includes a rubber component, a filler, a processing oil and a vulcanizing agent. The filler is provided at a concentration of between about 50 and 150 parts per hundred weight of the rubber component. The processing oil is substantially devoid of aromatic oil. The processing oil is provided at a concentration of between about 20 and 60 parts per hundred weight of the rubber component. The vulcanizing agent is provided at a concentration of between about 1 and 10 parts per hundred weight of the rubber component.

Another embodiment of the invention is directed to a method of belting for use in a conveyor. An environmentally friendly rubber composition is prepared from a rubber component, a filler, a processing oil and a vulcanizing agent. The filler is provided at a concentration of between about 50 and 150 parts per hundred weight of the rubber component. The processing oil is substantially devoid of aromatic oil. The processing oil is provided at a concentration of between about 20 and 60 parts per hundred weight of the rubber component. The vulcanizing agent is provided at a concentration of between about 1 and 10 parts per hundred weight of the rubber component. The rubber composition is associated with a fabric base to form a coated belt. The coated belt is vulcanized to form the conveyor.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
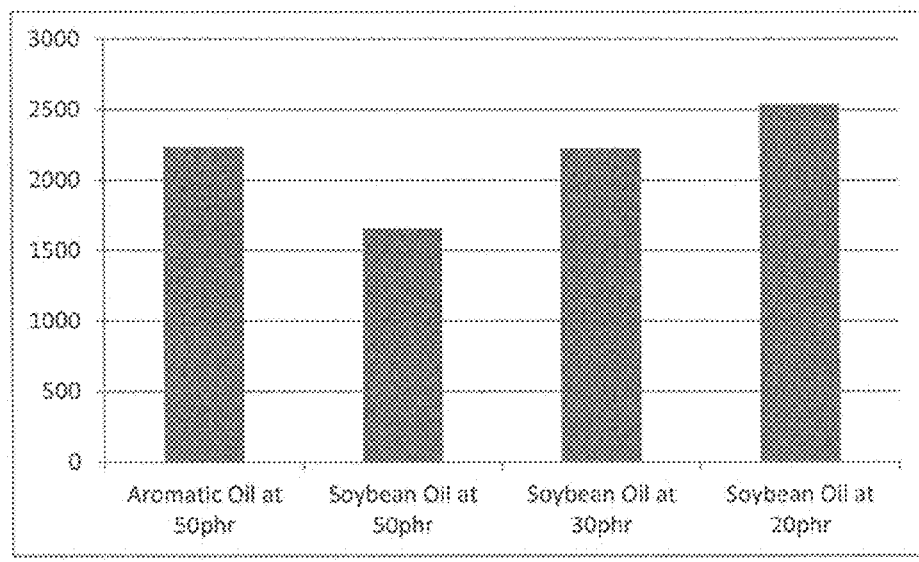
FIG. 1 is a graph comparing tensile strength of rubber fabricated with aromatic oil to rubber samples fabricated with several different concentrations of soybean oil.

Conveyor belts are used in a wide variety of applications because the conveyor belts enable large amounts of product to be efficiently moved. Conveyor belts generally include two primary components: (1) a fabric base and (2) a rubber coat. Depending on the intended use of the conveyor belt, cleats may be attached to the conveyor belt in a spaced-apart configuration to increase the capacity of the conveyor belt. The shape, size and placement of the cleats on the conveyor belt may be selected based upon a variety of factors such as the product that is being moved on the conveyor.

The fabric base is generally provided in two configurations—spun and filament. Spun fabric is made from staple fibers that are spun to produce the strands, which are then woven to produce the spun fabric. Filament fabric, on the other hand, is formed from continuous extruded filament threads. A variety of factors can affect which type of fabric is used in fabricating a particular conveyor belt.

There are two primary techniques in which the fabric base is coated with rubber—skim coating and friction coating. With skim coating, a layer of rubber material is laid on a fabric base but is not forced into the weave on the fabric base. In contrast, friction coating applies rubber to a fabric base using a calender with rolls running at different surface speeds to urge the rubber into the weave on the fabric base.

A variety of factors can affect which technique is used to apply the rubber composition to the fabric base. For example, while skim coating is typically viewed as being suitable for use in conjunction with a variety of fabrics, the layer of rubber provided by skim coating is typically much thicker than the layer of rubber that is provided by friction coating. In certain embodiments, this increased thickness of the rubber can be undesirable because it increases the overall weight of the conveyor.

Prior to coating the fabric base with the rubber composition, the fabric base may be treated to enhance the rubber adhesion, an example of which includes applying a layer of resorcinol formaldehyde latex to the surface of the fabric base. After the rubber composition has been coated on the fabric base, it is possible to use additional techniques to increase the strength and/or durability of the rubber composition, examples of which include pressure and heat.

One of the primary components of the rubber composition is the rubber component. For this reason, it is customary to set forth the concentration of the other components used in the rubber composition with respect to the amount of the rubber component.

The rubber component may be natural rubber or a mixture of natural rubber and synthetic rubber. An example of one type of synthetic rubber that can be used in conjunction with fabricating the conveyor belt is styrene-butadiene rubber. A person of skill in the art will appreciate that the styrene-butadiene rubber may have a variety of compositions using the concepts of the invention.

The rubber composition contains a filler. Examples of suitable fillers include carbon black, silica, calcium carbonate, calcium sulfate, clay, mica and combinations thereof. In certain embodiments, the filler is provided at a concentration of between about 50 and 150 parts per hundred weight of the rubber component. In other embodiments, the filler is provided at a concentration of about 100 parts per hundred weight of the rubber component.

The rubber composition contains at least one processing oil that facilitates processing of the rubber composition. In certain embodiments, at least a portion of the processing oil is derived from a cereal such as castor oil, coconut oil, cotton seed oil, linseed oil, rapeseed oil, soybean oil, palm oil and peanut oil. In other embodiments, the processing oil is substantially derived from a cereal.

The processing oil is provided at a concentration of between about 10 and 70 parts per hundred weight of the rubber component. In other embodiments, the processing oil is provided at a concentration of between about 20 and 50 parts per hundred weight of the rubber component.

In certain embodiments, the processing oil is substantially devoid of aromatic oil. An advantage of formulating the rubber composition without the use of aromatic oil is that it avoids potential negative health issues relating to contact of humans with such aromatic oils either during the process of fabricating the rubber composition into a product or during the process of using products that are manufactured from the rubber composition.

Another advantage of formulating the rubber composition without aromatic oil is that cereal-derived oils set forth above are derived from renewable resources whereas the aromatic oils are typically derived from fossil fuels.

It has been found that yet another advantage of using the cereal-derived oil instead of the aromatic oil is that the cereal-derived oil can be used at a concentration that is significantly lower than the concentration of aromatic oil that is conventionally used in formulating rubber that is used in conjunction with belting applications.

In certain embodiments, the concentration of cereal-derived oil that is used in formulating the rubber is at least 25 percent less than the concentration of aromatic oil conventionally used when fabricating rubber for belting applications. In other embodiments, the concentration of cereal-derived oil that is used in formulating the rubber is between about 30 and 60 percent less than the concentration of aromatic oil conventionally used when formulating rubber for belting applications.

In other embodiments, a minor portion (i.e., less than 50 parts per hundred weight) of the processing oil comprises paraffinic, naphthenic or aromatic process oil, ethylene-α-olefin cooligomer, mineral oil such as paraffin wax and fluid paraffin. In still other embodiments, the concentration of the additional oil component is less than about 5 parts per hundred weight of the rubber component.

The rubber composition may include at least one vulcanizing agent. Examples of suitable vulcanizing agents include sulfur and organic peroxides. In certain embodiments, the concentration of the vulcanization agent is between about 1 and 10 parts per hundred weight of the rubber component. In other embodiments, the concentration of the vulcanization agent is between about 2 and 5 parts per hundred weight of the rubber component.

The rubber composition may include at least one antioxidant. An example of suitable antioxidants include N-phenyl-N'-cyclohexyl-p-phenylenediamine, N-(1,3-dimethylbutyl)-N'-phenyl-p-phenylenediamine and 2,2,4-trimethyl-1,2-dihydroquinoline. In certain embodiments, the antioxidant is provided at a concentration of up to about 10 parts per hundred weight of the rubber component. In other embodiments, the antioxidant is provided at a concentration of between about 0.5 and 3.0 parts per hundred weight of the rubber component.

The rubber composition may also be incorporated with activators and accelerators for their further improvement in cure rate. Examples of potential activators and accelerators include zinc oxide, stearic acid, diphenyl guanidine, N-tert-butyl-2-benzothiazolesulfenamide, tetramethylthiuram disulfide, and sulfenamide (N-oxydiethylene benzothiazole sulfenamide). In certain embodiments, the activators and accelerators are provided at a concentration of between about 1 and 10 parts per hundred weight of the rubber component.

The rubber composition of the present invention may optionally include other additives. Examples of such additives are age resistor, wax, anti-ozonant, antioxidant, foaming agent, plasticizer, internal lubricant, tackifier, and UV absorber. The additives are each provided at an effective concentration. In certain embodiments, the concentration of each of the additives is less than about 3 parts per hundred weight of the rubber component.

The tackifier may be particularly desirable when the rubber composition is used in conjunction with friction coating of a fabric base. The tackifier used in conjunction with the rubber composition may be similar to the tackifiers used in conjunction with conventional rubber compositions.

In certain embodiments, the rubber composition is fabricated in two steps. The first step involves preparing the master batch, which typically includes the rubber component, the filler, the processing oil and the antioxidants and anti-ozonants. A person of skill in the art will appreciate that various techniques may be used to fabricate the master batch. For example, in certain embodiments, the components used in fabricating the master batch are mixed until substantially uniform.

When it is desired to fabricate the final rubber component, the master batch is mixed with the vulcanizing agents and accelerators in a second step. A person of skill in the art will appreciate that additional compounds may also be added at this stage, but typically the vulcanizing agents and accelerators are left for the final mix.

The following example is presented for the purposes of illustrating and not limiting the scope of the present invention.

An example of one such medium quality conveyor belt cover included SBR extended with aromatic oils at a concentration of 100 part by hundred weight (phr) and aromatic oil at a concentration of 50 phr and a total weight of about 237 when including the fillers and processing aids.

Rubber samples were tested to evaluate the physical properties comparing rubber compositions made with aromatic oil to rubber compositions made with soybean oil. The experimental samples contained the same components at the same concentrations as the control rubber composition with exception of the aromatic oil being removed and soybean oil being substituted therefor. The soybean oil was used at concentrations of about 20, 30 or 50 parts per hundred weight of the rubber component.

The rubber formulation having soybean oil at a concentration of about 30 parts per hundred weight of the rubber component exhibited a tensile strength that was similar to the tensile strength of the rubber fabricated using the aromatic oil, as illustrated in FIG. 1. The tensile strength of the rubber formulations decreased as the soybean oil concentration increased. Based upon this data, the environmentally friendly rubber composition having a tensile strength of between about 2,000 psi and about 2,500 psi exhibits advantageous properties.

Figure 2:
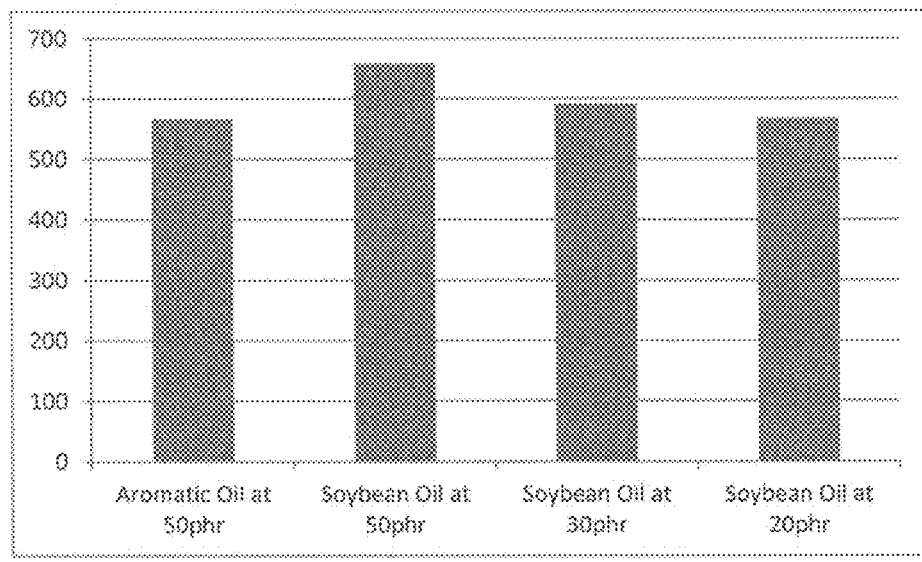
FIG. 2 is a graph comparing elongation of rubber fabricated with aromatic oil to rubber samples fabricated with several different concentrations of soybean oil.

The rubber formulation having soybean oil at a concentration of about 20 parts per hundred weight of the rubber component exhibited an elongation that was closest to the elongation of the rubber fabricated using the aromatic oil, as illustrated in FIG. 2. The elongation of the rubber formulations increased as the soybean oil concentration increased. Based upon this data, the environmentally friendly rubber composition having an elongation of between about 500% and about 600% exhibits advantageous properties.

Figure 3:
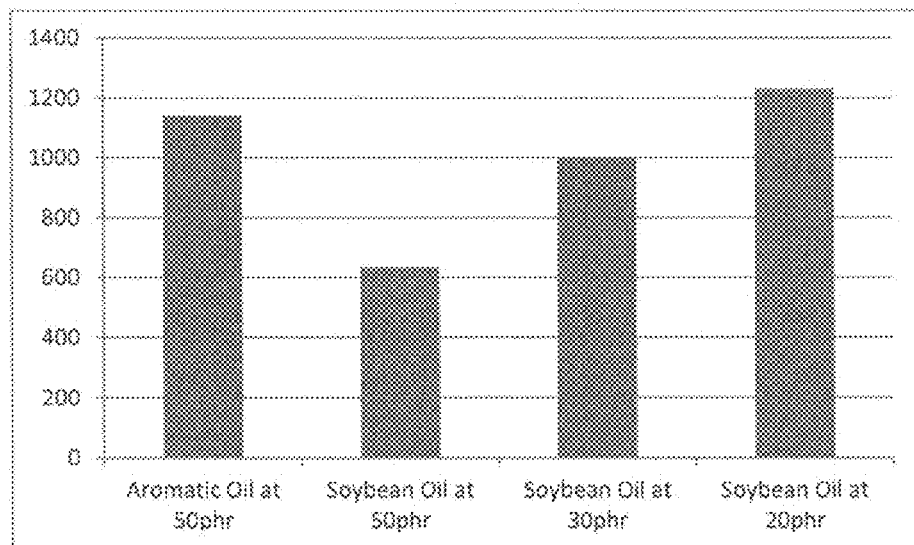
FIG. 3 is a graph comparing 300% modulus of rubber fabricated with aromatic oil to rubber samples fabricated with several different concentrations of soybean oil.

The 300% modulus of the rubber fabricated using the aromatic oil was intermediate the 300% modulus of the rubber formulations having soybean oil at concentrations of about 20 and 30 parts per hundred weight of the rubber component, as illustrated in FIG. 3. The 300% modulus of the rubber formulations decreased as the soybean oil concentration increased. Based upon this data, the environmentally friendly rubber composition having 300% modulus of between about 800 psi and about 1,200 psi exhibits advantageous properties.

Figure 4:
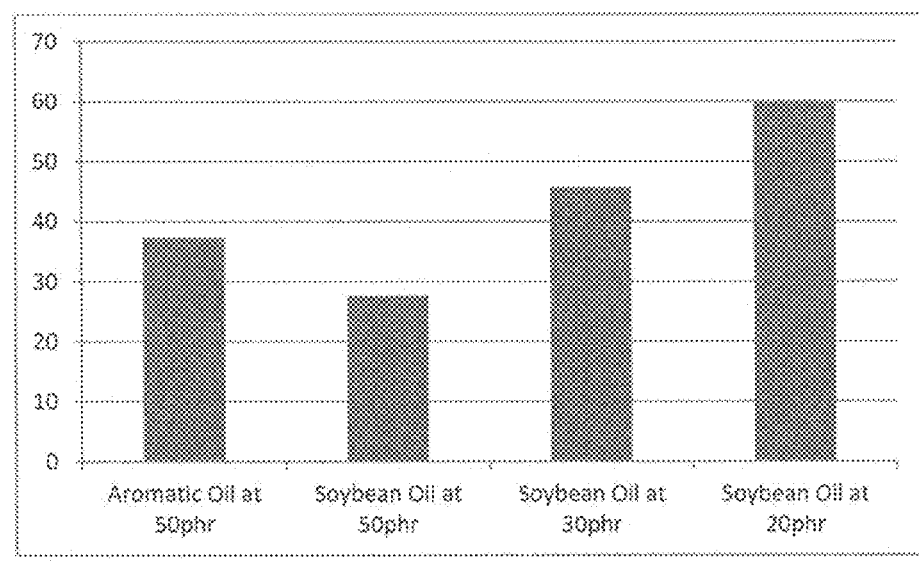
FIG. 4 is a graph comparing Mooney viscosity low of rubber fabricated with aromatic oil to rubber samples fabricated with several different concentrations of soybean oil.

The Mooney viscosity of the rubber fabricated using the aromatic oil was intermediate the Mooney viscosity of the rubber formulations having soybean oil at concentrations of about 30 and 50 parts per hundred weight of the rubber component, as illustrated in FIG. 4. The Mooney viscosity of the rubber formulations decreased as the soybean oil concentration increased. Based upon this data, the environmentally friendly rubber composition having a Mooney viscosity of between about 30 and about 50 exhibits advantageous properties.

Figure 5:
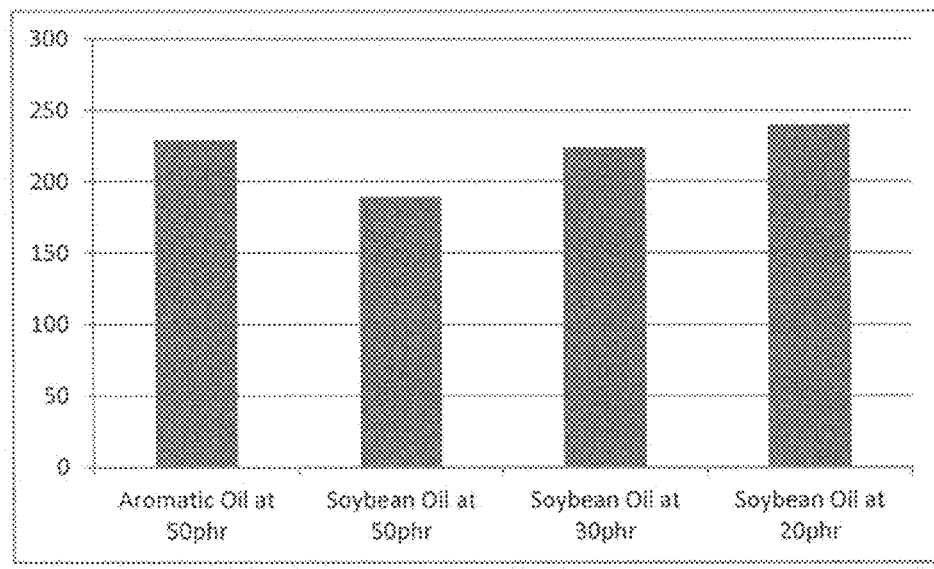
FIG. 5 is a graph comparing tear strength of rubber fabricated with aromatic oil to rubber samples fabricated with several different concentrations of soybean oil.

The rubber formulation having soybean oil at a concentration of about 30 parts per hundred weight of the rubber component exhibited a tear strength that was similar to the tear strength of the rubber fabricated using the aromatic oil, as illustrated in FIG. 5. The tear strength of the rubber formulations decreased as the soybean oil concentration increased. Based upon this data, the environmentally friendly rubber composition having a tear strength of between about 200 lbs/inch and about 250 lbs/inch exhibits advantageous properties.

Figure 6:
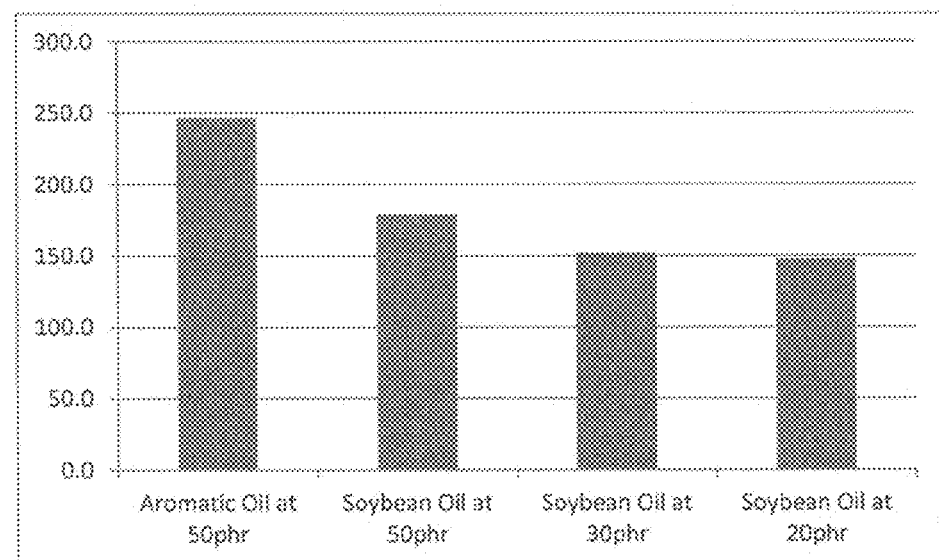
FIG. 6 is a graph comparing din abrasion of rubber fabricated with aromatic oil to rubber samples fabricated with several different concentrations of soybean oil.

The Din abrasion index of the rubber formulation fabricated using aromatic oil was greater than the Din abrasion index of all of the rubber formulations fabricated using soybean oil, as illustrated in FIG. 6. The Din abrasion of the rubber formulations increased as the soybean oil concentration increased. Based upon this data, the environmentally friendly rubber composition having a Din abrasion of less than about 250 $mm^3$ exhibits advantageous properties.

When the characteristics of the three rubber formulations fabricated using the soybean oil processing aid are evaluated together, the overall performance of the rubber formulation fabricated using the soybean oil at a concentration of about 30 parts per hundred weight of the rubber component exhibited the optimal performance characteristics to most closely match the aromatic oil control sample.

The most surprising result was the improved abrasion resistance in the rubber formulation when using soy oil. By changing only the oil type from aromatic to soy, a significant increase in the abrasion resistance was found.

The resistance to abrasion wear is one of the most important properties of a rubber compound. The Din abrader is the standard test used in conveyor belting for abrasion wear. Abrasion is wear thought of as material loss; therefore, the Din abrasion index is expressed in cubic millimeters material loss. The lower the Din abrasion index number means the greater the resistance to abrasion.

Even though the evaluation was only done using soybean oil, it is anticipated that the other grain-derived oils would exhibit results that are similar to the results exhibited by the rubber formulation containing the soybean oil processing aid because these other grain-derived oils have chemical profiles to the chemical profile of soybean oil.

It is contemplated that features disclosed in this application, as well as those described in the above applications incorporated by reference, can be mixed and matched to suit particular circumstances. Various other modifications and changes will be apparent to those of ordinary skill.

The invention claimed is:
1. Belting for use in a conveyor, wherein the belting comprises:
   a fabric base; and
   an environmentally friendly rubber composition applied to at least one surface of the fabric base, wherein the environmentally friendly rubber composition comprises:
      a rubber component;
      a filler provided at a concentration of between about 50 and 150 parts per hundred weight of the rubber component;
      a processing oil that is substantially devoid of aromatic oil, wherein the processing oil comprises soybean oil, wherein the processing oil is provided at a concentration of between about 30 and 60 parts per hundred weight of the rubber component; and a vulcanizing agent provided at a concentration of between about 1 and 10 parts per hundred weight of the rubber component, wherein the environmentally friendly rubber composition exhibits a tensile strength of between about 2,000 psi and about 2,500 psi, an elongation of between about 500% and about 600% and a Din abrasion of less than about 250 mm3.

2. The belting of claim 1, wherein the fabric base contains at least one of spun fibers and filament fibers.

3. The belting of claim 1, wherein the processing oil further comprises at least one of castor oil, coconut oil, cotton seed oil, linseed oil, rapeseed oil, palm oil and peanut oil.

4. The belting of claim 1, wherein the rubber component comprises natural rubber, synthetic rubber or a combination thereof, wherein the filler comprises carbon black, silica, calcium carbonate, calcium sulfate, clay, mica or combinations thereof and wherein the vulcanizing agent comprises sulfur, organic peroxides or combinations thereof.

5. The belting of claim 1, and further comprising at least one of N-phenyl-N'-cyclohexyl-p-phenylenediamine, N-(1,3-dimethylbutyl)-N'-phenyl-p-phenylenediamine and 2,2,4-trimethyl-1,2-dihydroquinoline that is provided in the environmentally friendly rubber composition at a concentration of up to about 10 parts per hundred weight of the rubber component.

6. The belting of claim 1, and further comprising at least one of zinc oxide, stearic acid, diphenyl guanidine, N-tert-butyl-2-benzothiazolesulfenamide, tetramethylthiuram disulfide, and sulfenamide (N-oxydiethylene benzothiazole sulfenamide) that is provided in the environmentally friendly rubber composition at a concentration of between about 1 and 10 parts per hundred weight of the rubber component.

7. The belting of claim 1, and further comprising at least one of paraffinic, naphthenic or aromatic process oil, ethylene-α-olefin cooligomer, mineral oil, paraffin wax and fluid paraffin that is provided in the environmentally friendly rubber composition at a concentration of not more than 5 parts per hundred weight of the rubber component.

8. The belting of claim 1, wherein the environmentally friendly rubber composition exhibits a 300% modulus of between about 800 psi and about 1,200 psi, a Mooney viscosity low of between about 30 and about 50, and a tear strength of between about 200 lbs/inch and about 250 lbs/inch.

9. An environmentally friendly rubber composition comprising:
a rubber component;
a filler provided at a concentration of between about 50 and 150 parts per hundred weight of the rubber component;
a processing oil that is substantially devoid of aromatic oil, wherein the processing oil comprises soybean oil, wherein the processing oil is provided at a concentration of between about 30 and 60 parts per hundred weight of the rubber component; and
a vulcanizing agent provided at a concentration of between about 1 and 10 parts per hundred weight of the rubber component, wherein the environmentally friendly rubber composition exhibits a tensile strength of between about 2,000 psi and about 2,500 psi, an elongation of between about 500% and about 600% and a Din abrasion of less than about 250 mm3.

10. The environmentally friendly rubber composition of claim 9, wherein the processing oil further comprises at least one of castor oil, coconut oil, cotton seed oil, linseed oil, rapeseed oil, palm oil and peanut oil.

11. The environmentally friendly rubber composition of claim 9, wherein the rubber component comprises natural rubber, synthetic rubber or a combination thereof, wherein the filler comprises carbon black, silica, calcium carbonate, calcium sulfate, clay, mica or combinations thereof and wherein the vulcanizing agent comprises sulfur, organic peroxides or combinations thereof.

12. The environmentally friendly rubber composition of claim 9, and further comprising at least one of N-phenyl-N'-cyclohexyl-p-phenylenediamine, N-(1,3-dimethylbutyl)-N'-phenyl-p-phenylenediamine and 2,2,4-trimethyl-1,2-dihydroquinoline that is provided in the environmentally friendly rubber composition at a concentration of up to about 10 parts per hundred weight of the rubber component.

13. The environmentally friendly rubber composition of claim 9, and further comprising at least one of zinc oxide, stearic acid, diphenyl guanidine, N-tert-butyl-2-benzothiazolesulfenamide, tetramethylthiuram disulfide, and sulfenamide (N-oxydiethylene benzothiazole sulfenamide) that is provided in the environmentally friendly rubber composition at a concentration of between about 1 and 10 parts per hundred weight of the rubber component.

14. The environmentally friendly rubber composition of claim 9, and further comprising at least one of paraffinic, naphthenic or aromatic process oil, ethylene-α-olefin cooligomer, mineral oil, paraffin wax and fluid paraffin that is provided in the environmentally friendly rubber composition at a concentration of not more than 5 parts per hundred weight of the rubber component.

15. The environmentally friendly rubber composition of claim 9, wherein the environmentally friendly rubber composition exhibits a 300% modulus of between about 800 psi and about 1,200 psi, a Mooney viscosity low of between about 30 and about 50, and a tear strength of between about 200 lbs/inch and about 250 lbs/inch.

16. A method of belting for use in a conveyor, wherein the method comprises:
preparing an environmentally friendly rubber composition comprising a rubber component, a filler, a processing oil and a vulcanizing agent, wherein the filler is provided at a concentration of between about 50 and 150 parts per hundred weight of the rubber component, wherein the processing oil is substantially devoid of aromatic oil, wherein the processing oil comprises soybean oil, wherein the processing oil is provided at a concentration of between about 30 and 60 parts per hundred weight of the rubber component and wherein the vulcanizing agent is provided at a concentration of between about 1 and 10 parts per hundred weight of the rubber component, wherein the environmentally friendly rubber composition exhibits a tensile strength of between about 2,000 psi and about 2,500 psi, an elongation of between about 500% and about 600% and a Din abrasion of less than about 250 mm3;
coating the rubber composition on a fabric base to form a coated belt; and
vulcanizing the coated belt to form the conveyor.

17. The method of claim 16, wherein the environmentally friendly rubber composition is coated on the fabric base using at least one of skim coating and friction coating.

18. The method of claim 16, wherein the processing oil further comprises at least one of castor oil, coconut oil, cotton seed oil, linseed oil, rapeseed oil, palm oil and peanut oil.

19. The method of claim 16, wherein the rubber component comprises natural rubber, synthetic rubber or a combination thereof, wherein the filler comprises carbon black, silica, calcium carbonate, calcium sulfate, clay, mica or combinations thereof and wherein the vulcanizing agent comprises sulfur, organic peroxides or combinations thereof.

20. The method of claim 16, and further comprising at least one of paraffinic, naphthenic or aromatic process oil, ethylene-α-olefin cooligomer, mineral oil, paraffin wax and fluid paraffin that is provided in the environmentally friendly rubber composition at a concentration of not more than 5 parts by weight of the rubber component.

21. The method of claim 16, wherein the environmentally friendly rubber composition exhibits a 300% modulus of between about 800 psi and about 1,200 psi, a Mooney viscosity low of between about 30 and about 50, a tear strength of between about 200 lbs/inch and about 250 lbs/inch.

\* \* \* \* \*